United States Patent [19]

Jones et al.

[11] Patent Number: 5,075,789
[45] Date of Patent: Dec. 24, 1991

[54] DISPLAYS HAVING IMPROVED CONTRAST

[75] Inventors: Philip J. Jones, Menlo Park; A. Brian Macknick, Los Altos Hills; Larry J. White, Newark, all of Calif.

[73] Assignee: Raychem Corporation, Del.

[21] Appl. No.: 505,206

[22] Filed: Apr. 5, 1990

[51] Int. Cl.⁵ .............................................. G02F 1/13
[52] U.S. Cl. ..................................... 357/40; 359/59; 359/48; 359/70; 359/97; 353/121; 353/122
[58] Field of Search ............... 350/331 R, 335, 339 R, 350/351, 345, 338; 353/119, 122, 121

[56] References Cited
U.S. PATENT DOCUMENTS

| | | | |
|---|---|---|---|
| 4,299,447 | 11/1981 | Saltan et al. | 350/331 R |
| 4,601,537 | 7/1986 | Saccocio | 350/331 R |
| 4,652,087 | 3/1987 | Bos et al. | 352/367 E |
| 4,693,560 | 9/1987 | Wiley | 350/345 |

Primary Examiner—Rolf Hille
Assistant Examiner—Tan Ho
Attorney, Agent, or Firm—Yuan Chao; Herb Burkard

[57] ABSTRACT

A display presenting an image having enhanced contrast has a screen which switches between a bright, image-presenting state and a dark, image-less state, to minimize glare from ambient light reflections. Alternatively, a shutter which switches between a substantially transparent state and a dark, light absorbing state is placed over a conventional screen.

4 Claims, 13 Drawing Sheets

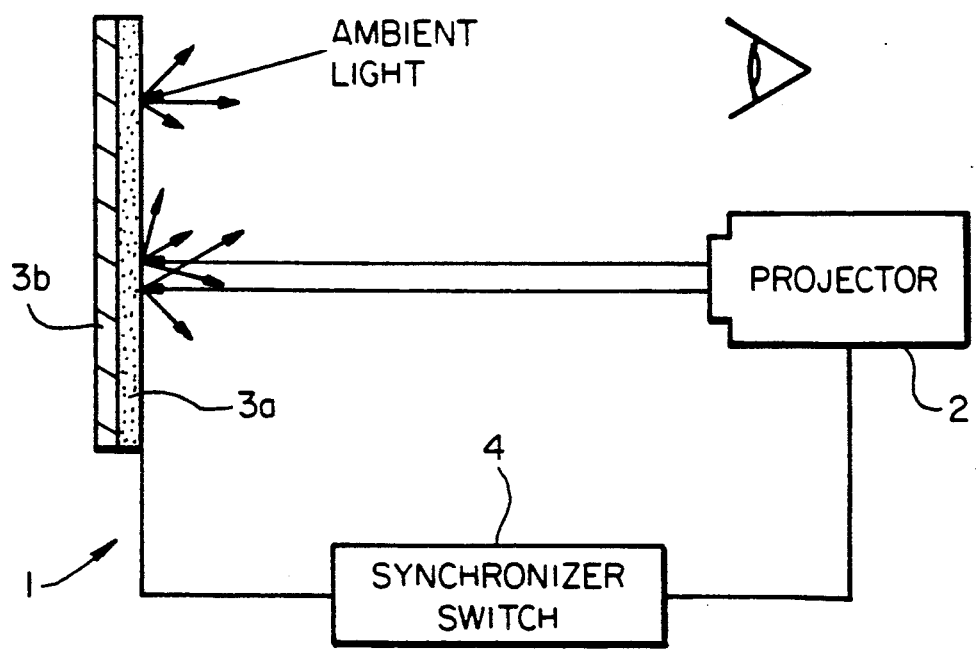
FIG_1a
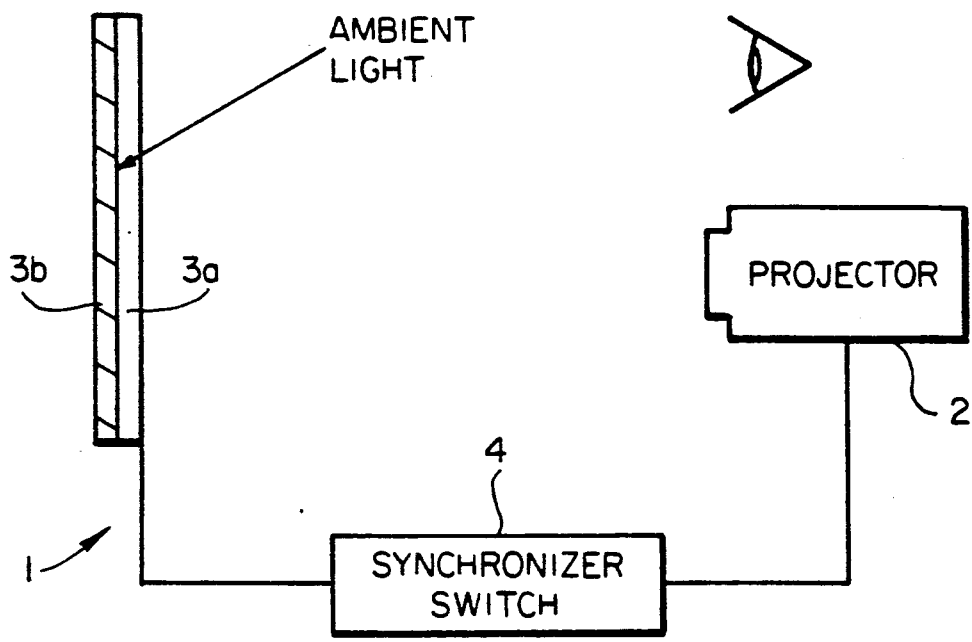
FIG_1b

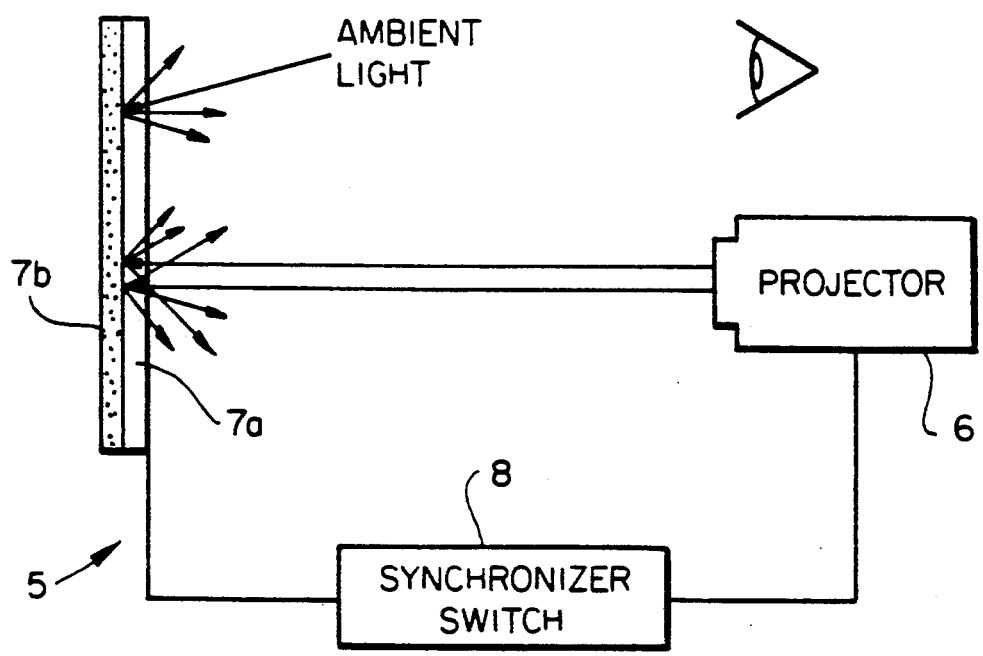
FIG_2a
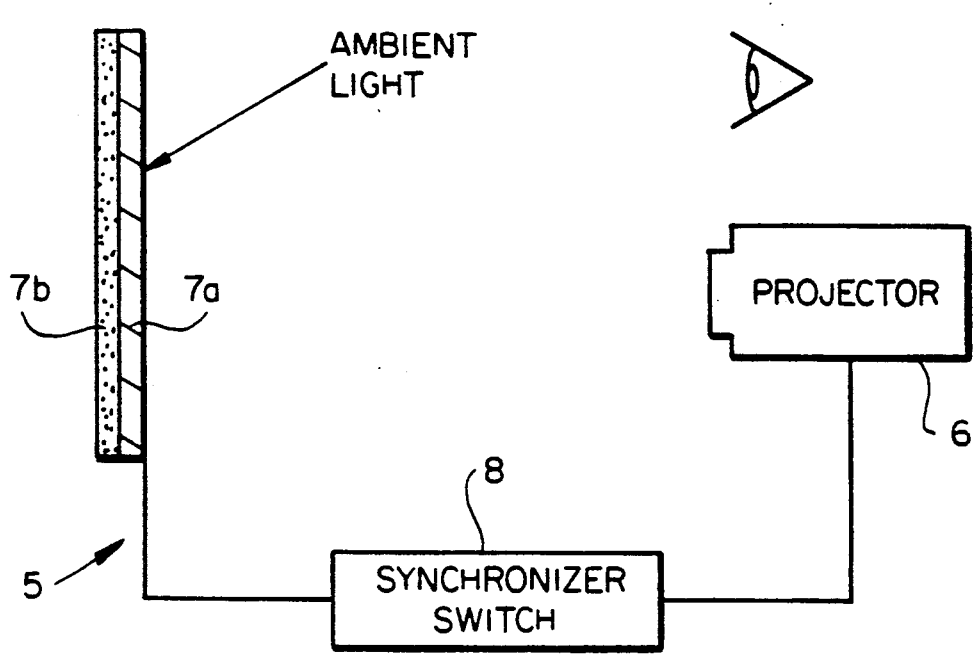
FIG_2b

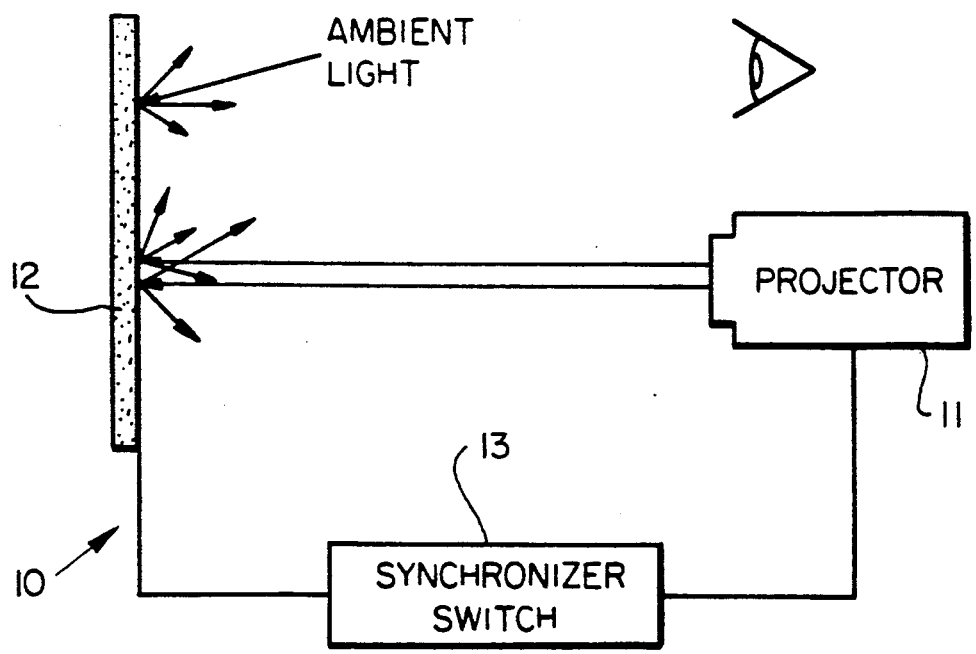
FIG_3a
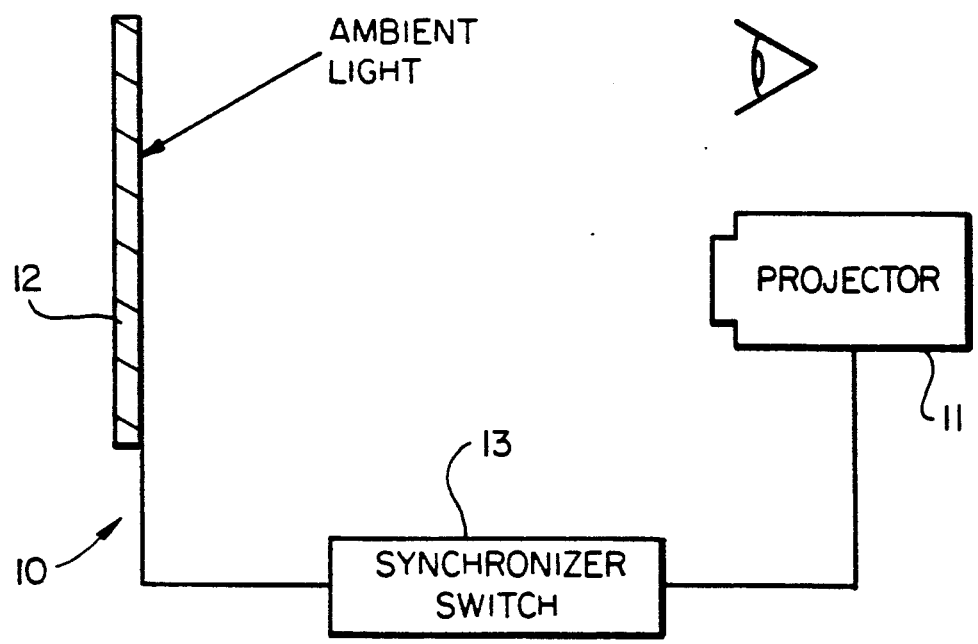
FIG_3b

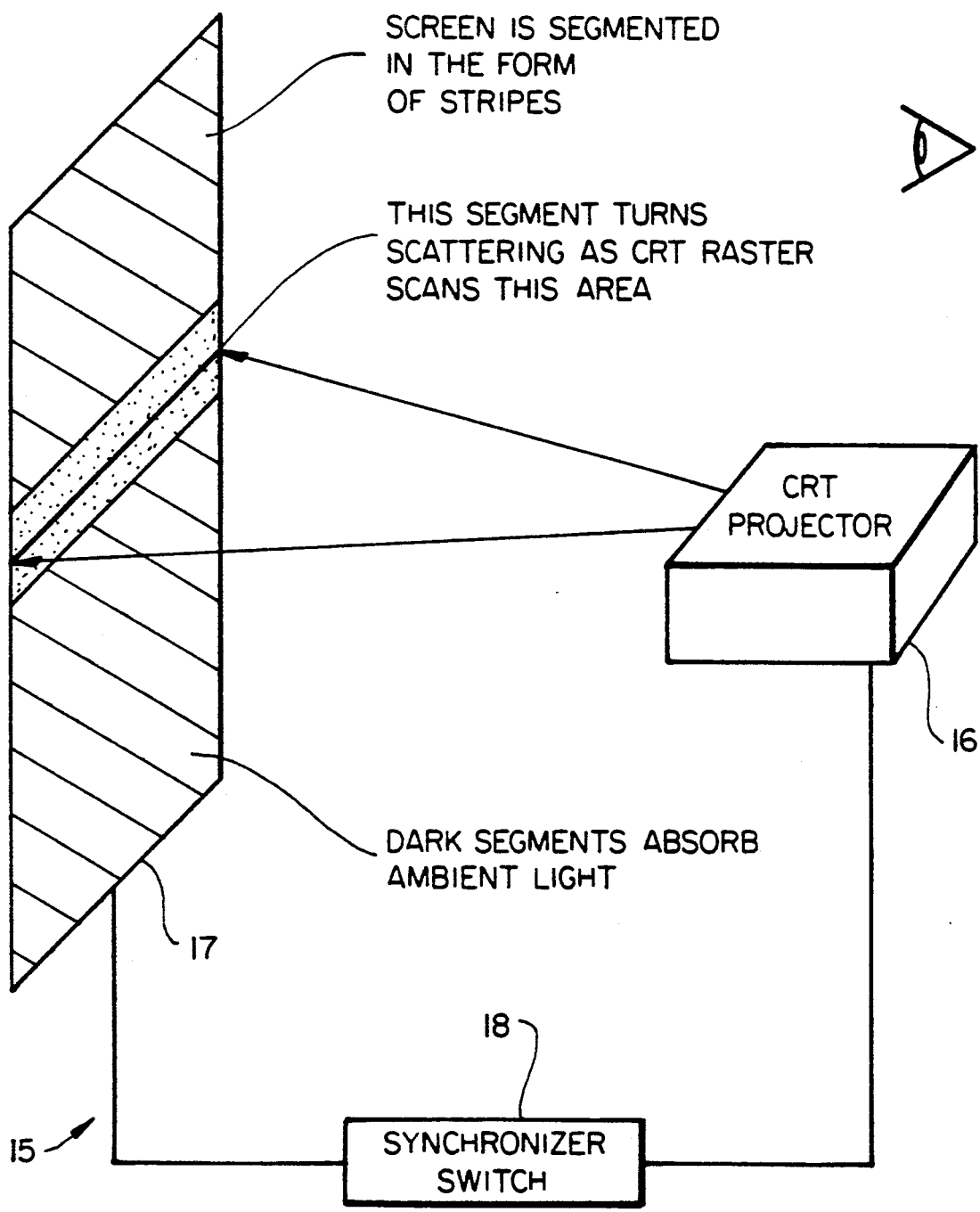
FIG_4

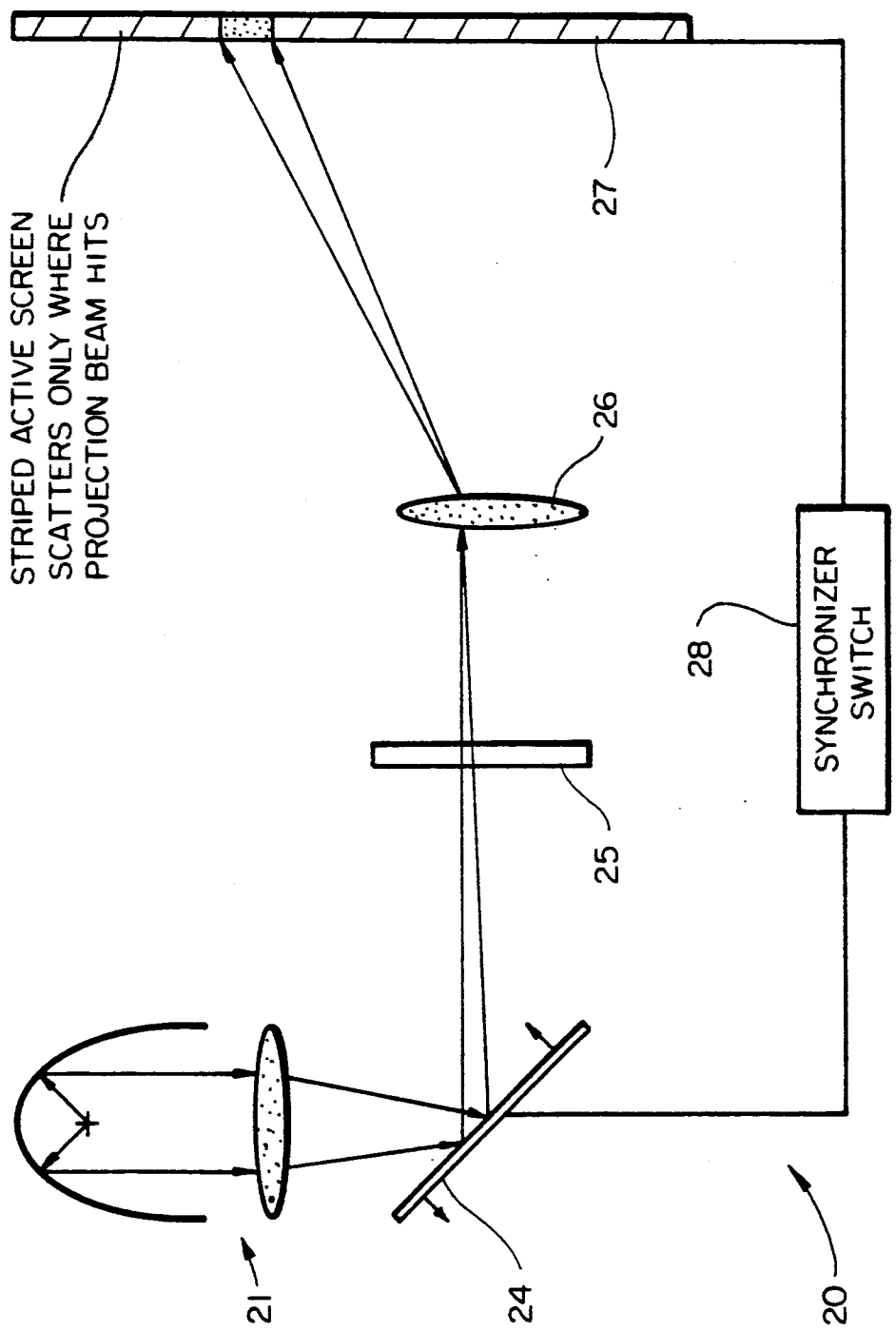

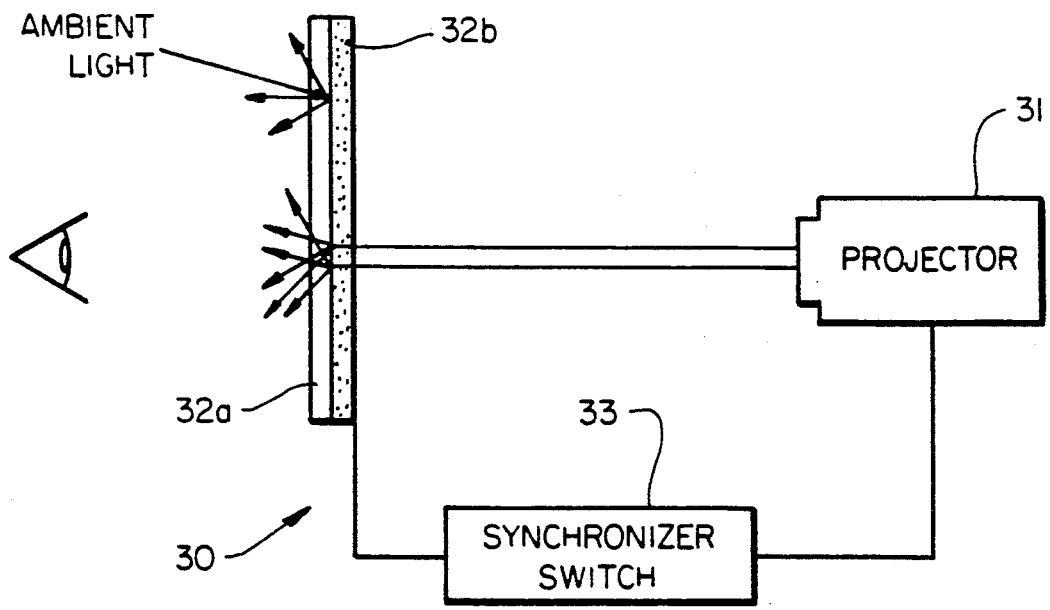
FIG_6a
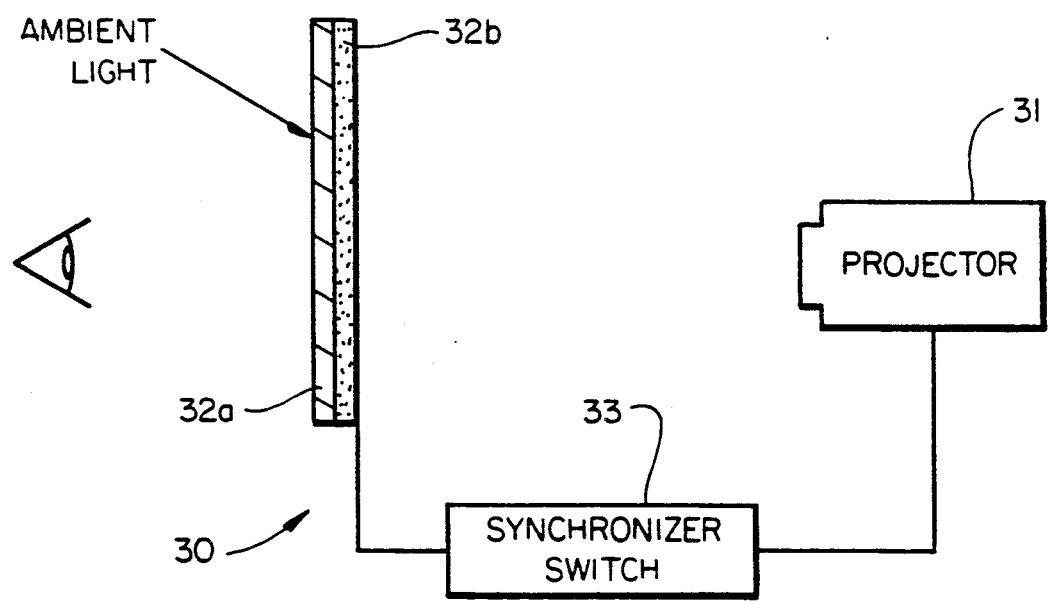
FIG_6b

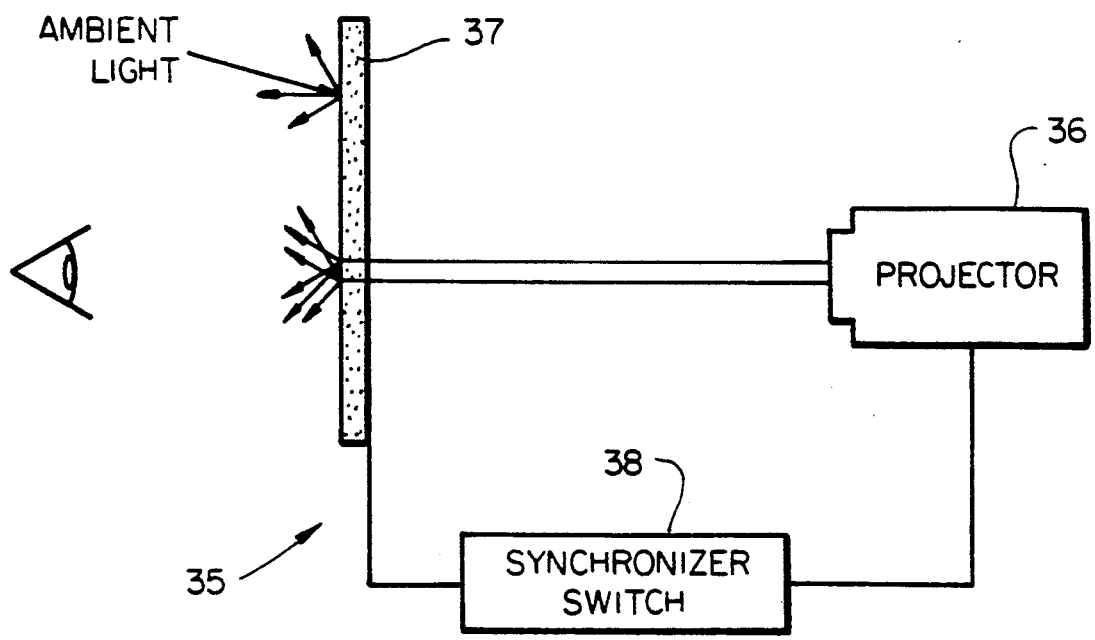
FIG_7a
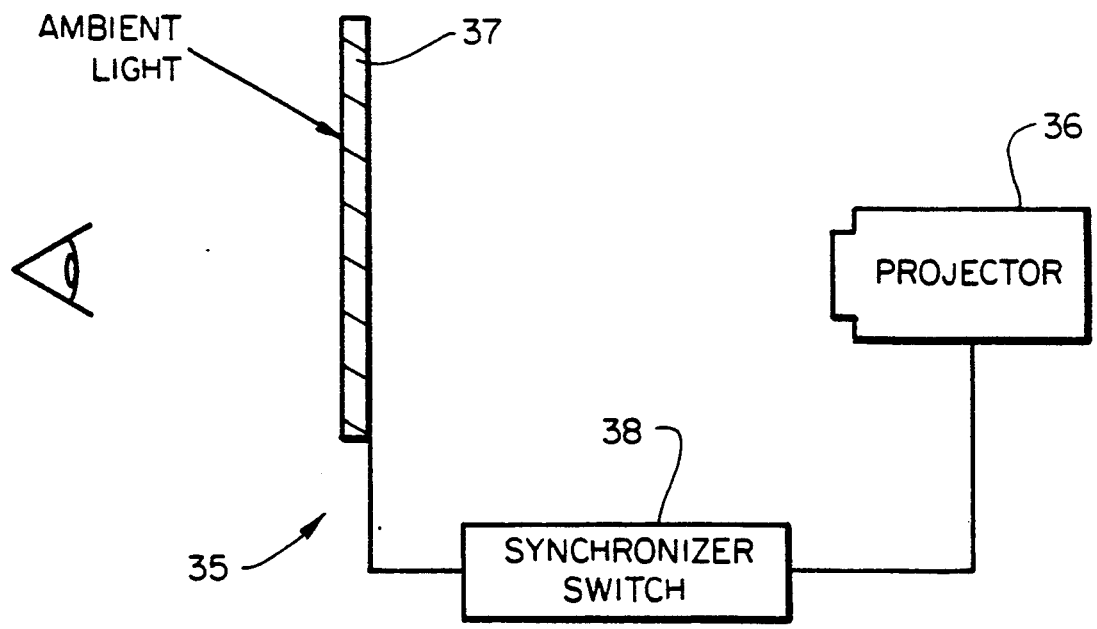
FIG_7b

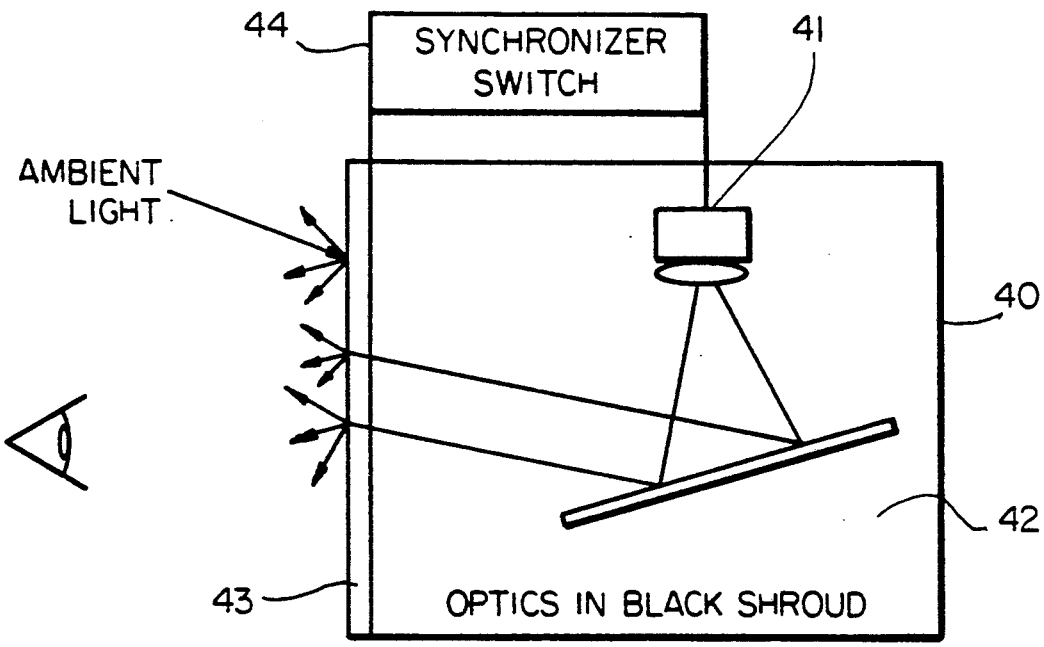
FIG_8a
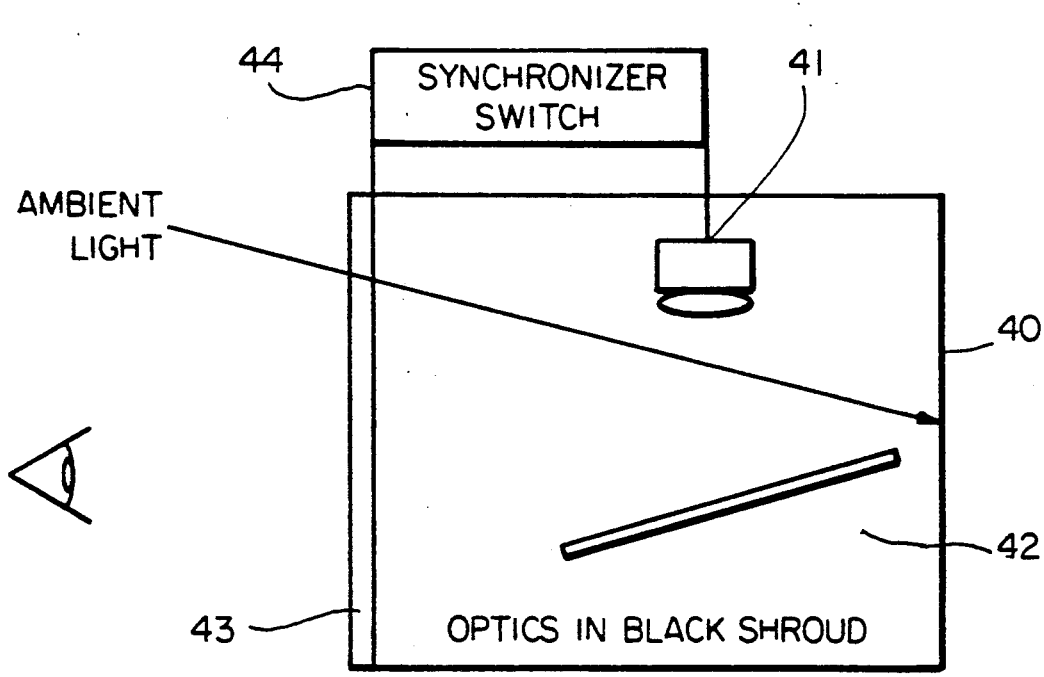
FIG_8b

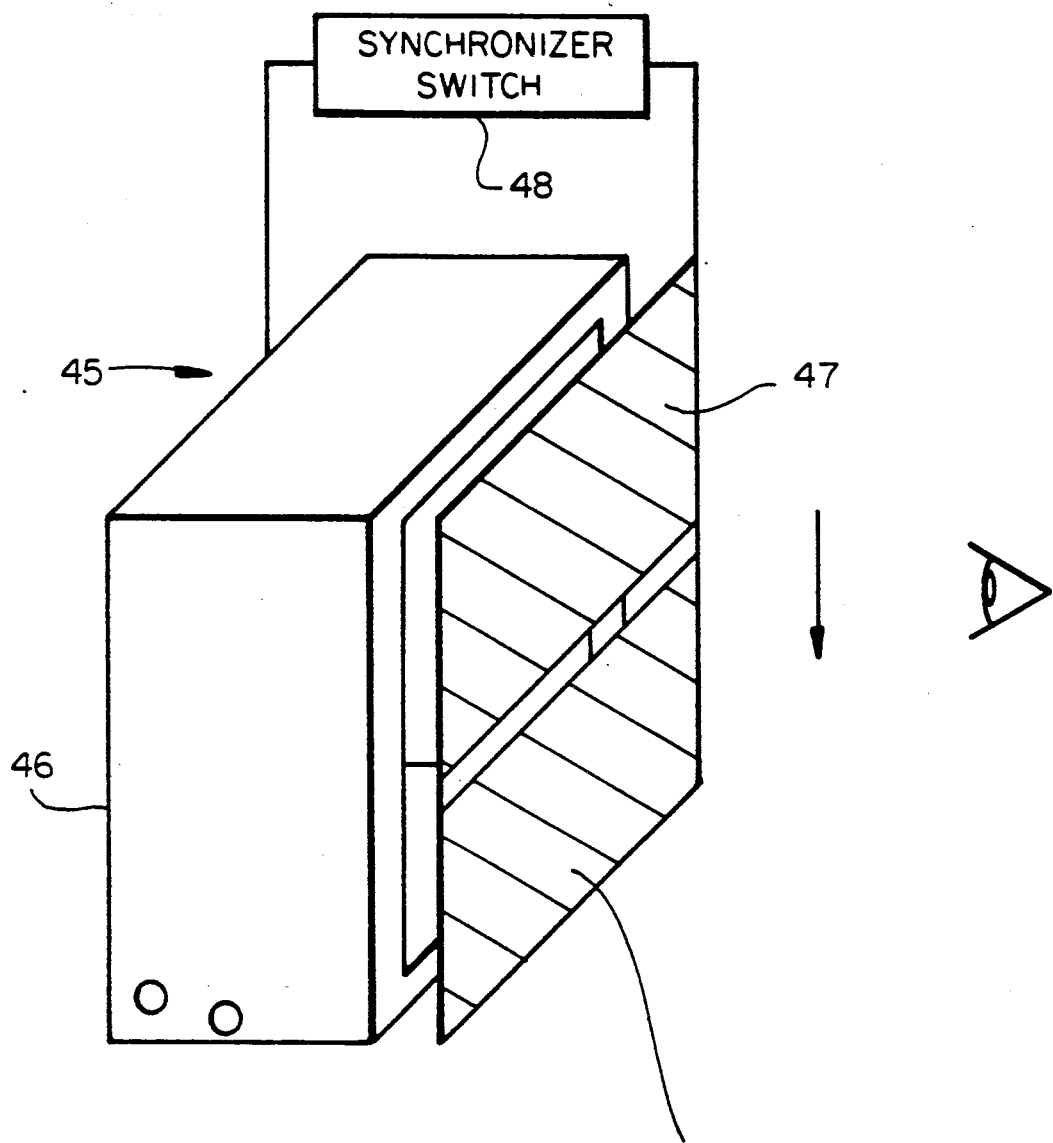
FIG_9

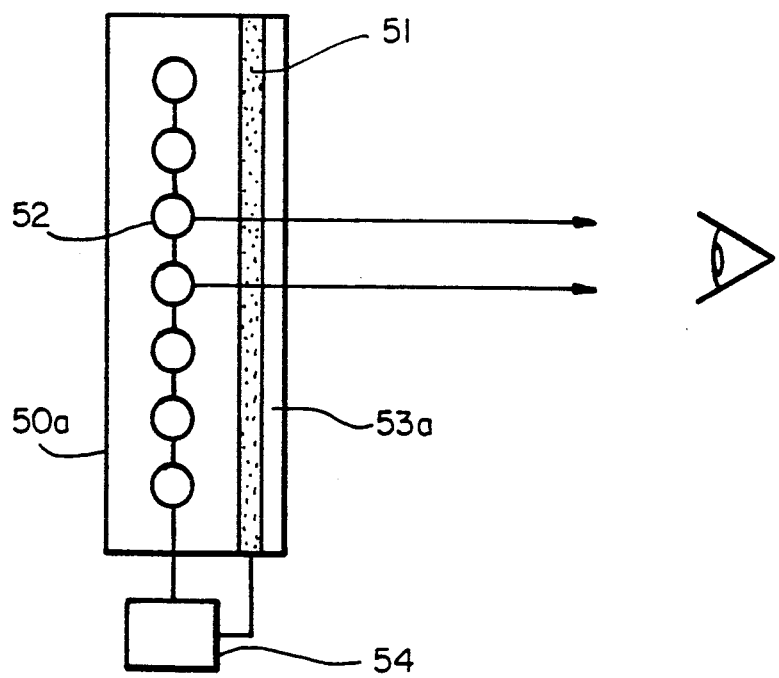
*FIG_10a*
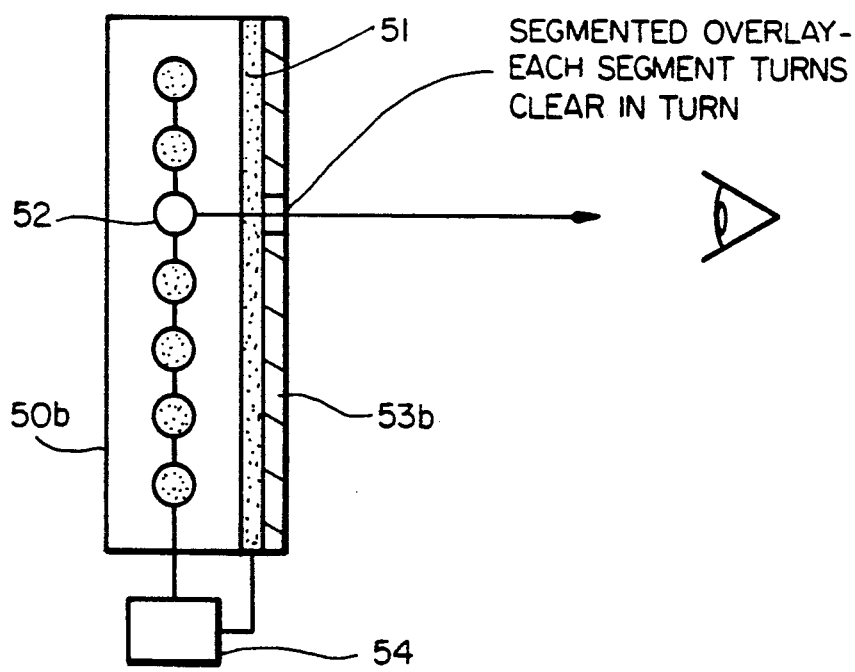
*FIG_10b*

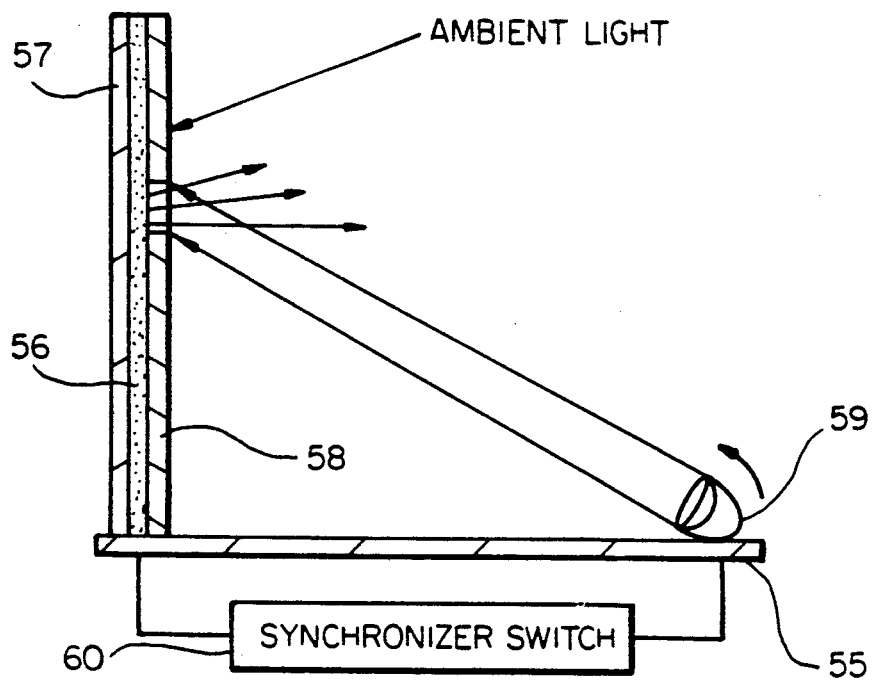
FIG_11
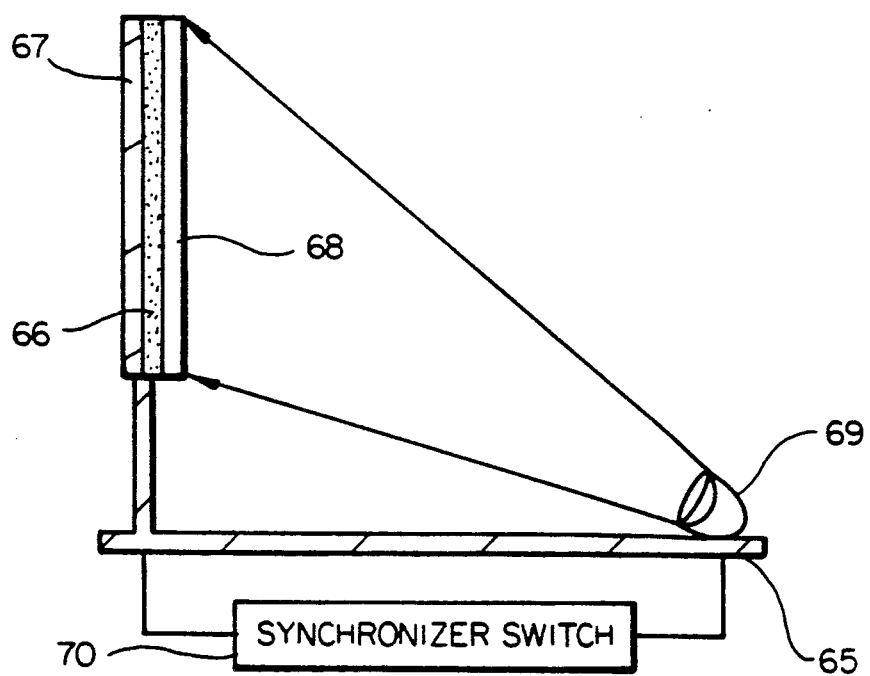
FIG_12

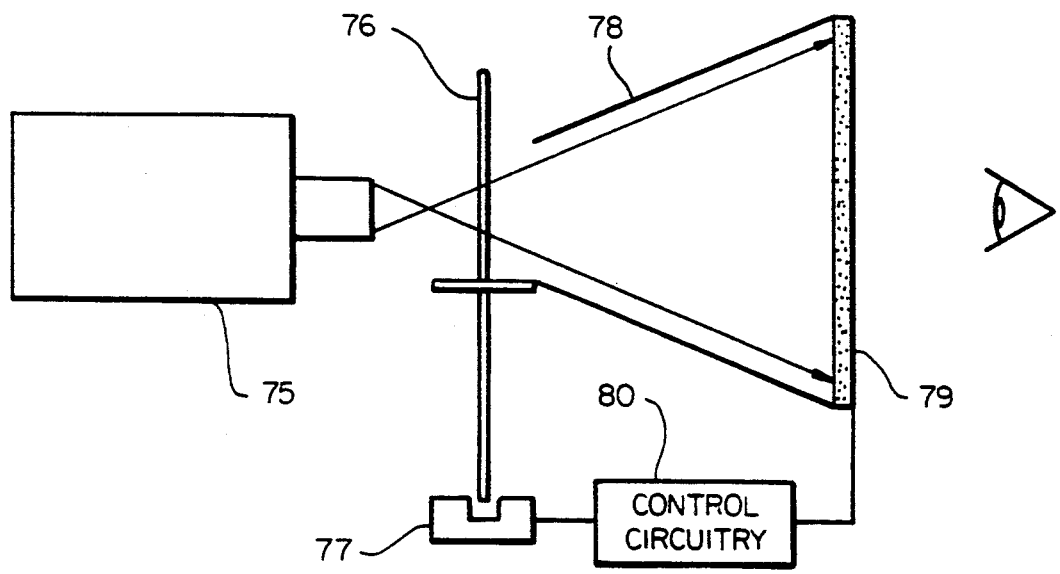
FIG_13a
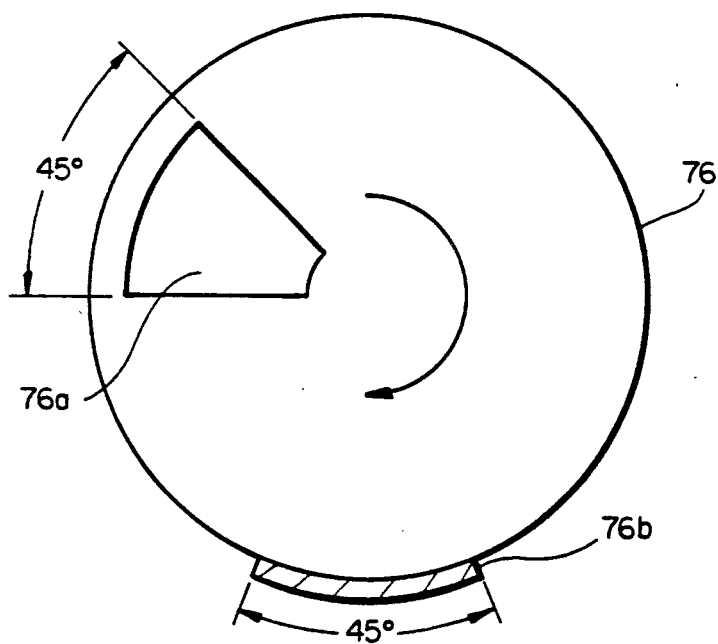
FIG_13b

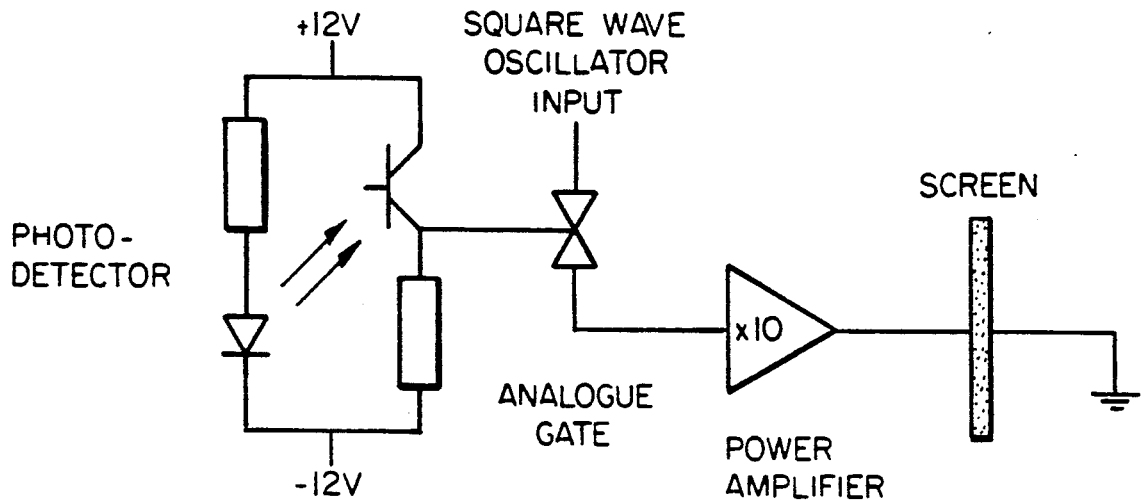
FIG_14
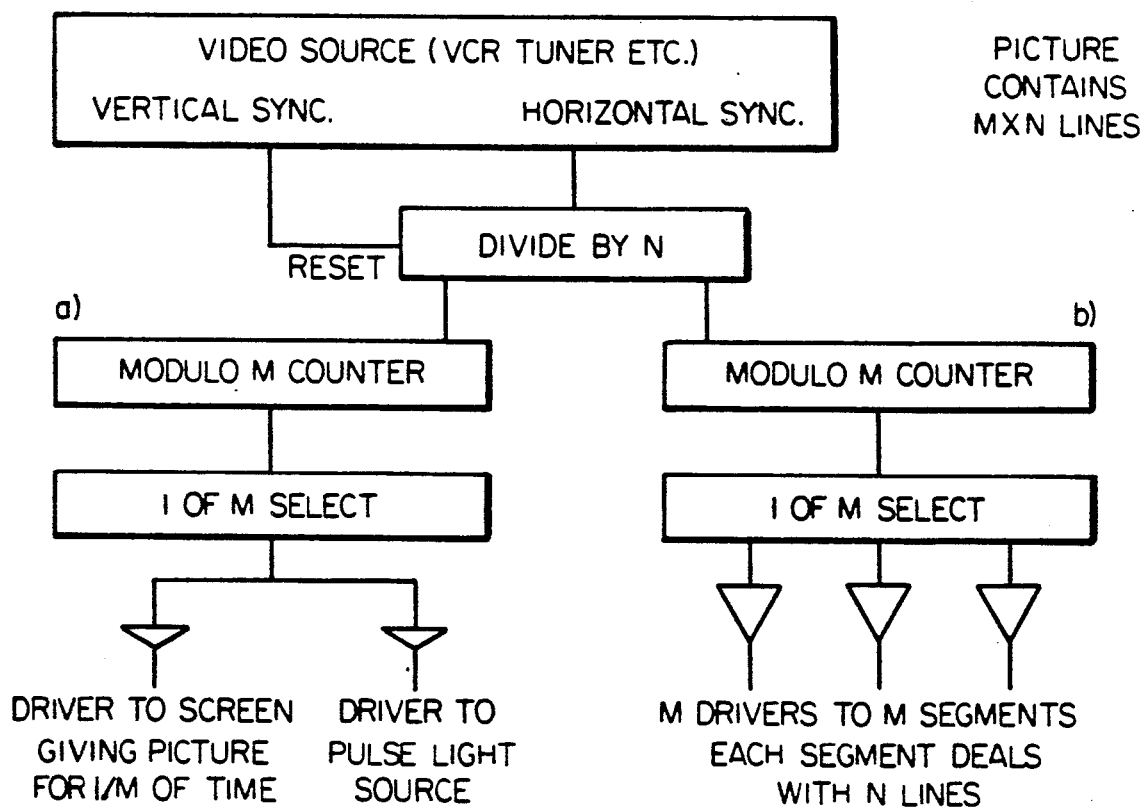
FIG_15

DISPLAYS HAVING IMPROVED CONTRAST

BACKGROUND OF THE INVENTION

This invention relates to displays having improved contrast.

The contrast ratio of displays is diminished by ambient light reflecting from the surfaces of the display. This effect occurs for all types of displays—backlit, reflective, or projection displays—and regardless of whether the display image is passive (i.e., relies of extrinsic lighting for visualization, for example a liquid crystal display) or self-luminous (e.g., a cathode ray tube display). To improve contrast, it is desirable to reduce or eliminate ambient reflections, preferably without decreasing significantly the brightness of the display image.

One approach to this problem in the case of backlit or rear projection displays is to add a contrast enhancing filter to the faceplate of the display. The filter attenuates ambient light more than light from the image, because ambient light must pass through the filter twice, while the image light does so only once. For example, if the filter attenuates light passing therethrough by a factor of 3.2, it will reduce ambient light reflections by a factor of 3.2 squared, or ten, while the image brightness will be reduced by a factor of only 3.2. However, the increased contrast is achieved at the expense of image brightness, because the image is now also significantly less bright than it would have been without the filter's presence.

For the aforementioned reasons, it is desirable to provide a display in which ambient light reflections are reduced, by a factor of preferably about 10, while the image brightness remains undiminished. The present invention provides displays having such characteristics.

SUMMARY OF THE INVENTION

This invention provides a projection display presenting an image with improved contrast, comprising
  (a) a screen which is switchable between a strongly light scattering state and a strongly light absorbing state;
  (b) projection means for intermittently projecting an image onto the screen; and
  (c) switching means for switching the screen synchronously with the projection of the image thereonto by the projection means, such that the screen is in its strongly light scattering state when the image is being projected thereonto and is in its strongly light absorbing state when the image is not being projected thereonto.

This invention provides another projection display presenting an image with improved contrast, comprising
  (a) a screen comprising a plurality of segments, each segment being switchable between a strongly light scattering state and a strongly light absorbing state;
  (b) projection means for sequentially projecting a portion of an overall image onto each segment; and
  (c) switching means for switching each segment synchronously with the projection thereonto of the portion of the overall image by the projection means, such that each segment is in its strongly light scattering state when the portion of the overall image is being projected thereonto and is in its strongly light absorbing state when the portion of the overall image is not being projected thereonto.

This invention provides yet another projection display presenting an image with improved contrast, comprising
  (a) a screen which is switchable between a strongly light scattering state and a substantially transparent state;
  (b) projection means for intermittently projecting an image onto the screen;
  (c) a housing containing the projection means and onto which the screen is mounted; the housing having a strongly light absorbing interior; and
  (d) switching means for switching the screen sychronously with the projection of the image thereonto by the projection means, such that the screen is in its strongly light scattering state when the image is being projected thereonto and is in its substantially state when the image is not being projected thereonto.

This invention provides still another projection display presenting an image with improved contrast, comprising
  (a) a screen comprising a plurality of segments, each segment being switchable between a strongly light scattering state and a substantially transparent state;
  (b) projection means for sequentially projecting a portion of an overall image onto each segment;
  (c) a housing containing the projection means and onto which the screen is mounted; the housing having a strongly light absorbing interior; and
  (d) switching means for switching each segment synchronously with the projection thereonto of the portion of the overall image by the projection means, such that each segment is in its strongly light scattering state when the portion of the overall image is being projected thereonto and is in its substantially transparent state when the portion of the overall image is not being projected thereonto.

This invention also provides a scanned self-luminous display presenting an image with improved contrast, comprising
  (a) a luminescent picture display unit on which an image is formed by scanning;
  (b) a shutter over the picture display unit, comprising a plurality of segments, each segment being switchable between a substantially transparent state and a strongly light absorbing state and being associated with a portion of the picture display unit; and
  (c) switching means for switching each segment synchronously with the scanning, such that each segment is in its substantially transparent state when the portion of the picture display unit associated therewith is in its luminescent state state and is in its strongly light absorbing state when the portion of the picture display units associated therewith is not in its luminescent state.

In yet another aspect of this invention, there is provided a backlit display presenting an image with improved contrast, comprising
  (a) an imaging cell on which an image is formed;
  (b) a source of pulsed backlighting;
  (c) a shutter in front of the imaging cell, the shutter being switchable between a substantially transparent state and a strongly light absorbing state; and
  (d) switching means for switching the shutter synchronously with the pulsed backlighting, such that the shutter is in its substantially transparent state when the source of pulsed backlighting is in its light emissive state and is in its strongly light absorbing state when the source of pulsed backlighting is in its nonemissive state.

Another embodiment of this invention is a backlit display presenting an image with improved contrast, comprising
  (a) an imaging cell on which an image is formed;
  (b) a source of pulsed backlighting which sequentially illuminates portions of the imaging cell;
  (c) a shutter in front of the imaging cell, comprising a plurality of segments, each segment being switchable between a substantially transparent state and a strongly light absorbing state and being associated with a portion of the imaging cell which is being illuminated in sequence; and
  (d) switching means for switching each segment synchronously with the pulsed backlighting, such that each segment is in its substantially transparent state when the source of pulsed backlighting is illuminating the portion of the imaging cell with which the segment is associated and is in its strongly light absorbing state when the source of pulsed backlighting is not illuminating such portion of the imaging cell.

This invention also provides a reflective display presenting an image with improved contrast, comprising
  (a) an imaging cell on which an image is formed;
  (b) a reflector behind the imaging cell;
  (c) a shutter in front of the imaging cell, which shutter is switchable between a substantially transparent state and a strongly light absorbing state;
  (d) illuminating means for intermittently illuminating the shutter; and
  (e) switching means for switching the shutter synchronously with its illumination by the illuminating means, such that the shutter is in its substantially transparent state when the illuminating means is illuminating it and is in its strongly light absorbing state when the illuminating means is not illuminating it.

Another reflective display of this invention, presenting an image with improved contrast, comprises
  (a) an imaging cell on which an image is formed;
  (b) a reflector behind the imaging cell;
  (c) a shutter in front of the imaging cell, comprising a plurality of segments, each segment being switchable between a substantially transparent state and a strongly light absorbing state;
  (d) illuminating means for illuminating sequentially each segment of the shutter; and
  (e) switching means for switching each segment synchronously with its illumination by the illuminating means, such that each segment is in its substantially transparent state when the illuminating means is illuminating it and is in its strongly light absorbing state when the illuminating means is not illuminating it.

BRIEF DESCRIPTION OF THE DRAWING(S)

FIGS. 1a–1b, 2a–b, 3a–b, 4,5, 6a–b 7a–b, and 8a–b show projection displays of this invention.

FIG. 9 shows a cathode ray tube display of this invention.

FIGS. 10a–b show backlit displays of this invention.

FIGS. 11 and 12 show reflective displays of this invention.

FIGS. 13a and 13b show an experimental set-up for demonstrating the enhanced contrast obtained with displays of this invention. FIG. 14 shows a circuit used with the experimental set-up of FIGS. 13a and 13b.

FIG. 15 shows schematically a synchronization circuit usable to synchronize the displays of this invention.

DESCRIPTION OF THE PREFERRED EMBODIMENTS

Generally, in the displays of this invention the image is presented to the viewer intermittently, with a duty cycle of for example 1:10, meaning that the display presents the image for one length of time and is dark for the other ten lengths of time. The screen on which the image is presented is switchable, with the switching synchronized with the duty cycle so that when the image is being presented, the screen allows the image to pass onto the viewer, but when the image is not being presented, the screen is switched to a state in which ambient reflections are greatly reduced, for example by making the screen dark and highly light absorbent. Alternatively, a shutter or overlay having a light transmissive state and a light absorbent state is placed between the viewer and the screen, and similarly synchronized. For a duty cycle of 1:10, ambient reflections will be reduced by a factor of about 10, while image brightness is not affected. The duty cycle is preferably between 1:5 and 1:200. Cycle frequencies should be greater than the critical flicker frequency appropriate for a display's size and brightnes. Generally, frequencies of at least 50 Hz, more preferably at least 60 Hz, are preferred.

Turning now to the Figures, FIGS. 1a and 1b show schematically a front projection display in which a projector 2 intermittently projects an image onto a screen comprising a front layer 3a and a rear layer 3b. Front layer 3a is switchable between a strongly light scattering state (shown in FIG. 1a) and a substantially transparent state (shown in FIG. 1b). Rear layer 3b is dark and light absorbent. In FIG. 1a, projector 2 is in the "on" or projecting mode of its duty cycle, and the image is being projected onto front layer 3a. Synchronizer switch 4 synchronizes the switching of front layer 3a such that front layer 3a is in its light scattering state. Consequently, light from the projector (and also ambient light) is scattered back towards the viewer. In FIG. 1b, projector 2 is in its "off" or non-projecting mode, and no image is being projected onto the screen. Projector 2 can be made to project the image intermittently by a variety of methods. Projector 2 can be for example an arc lamp fed with a pulsed voltage or a flash tube fed by discharging a cyclically charged capacitor. Synchronizer switch 4 switches front layer 3a to its transparent state, so that ambient light passes therethrough and strikes and is absorbed by rear layer 3b. The viewer then sees a dark screen, with little or no ambient light being reflected back to him or her. The net effect is that the viewer sees a high contrast image—the screen is bright during the times the image is being projected, but dark during the other times. It is preferred that front layer 3a, when in its strongly light scattering state, when a beam of light collimated to within 5° impinges thereon, scatter at least 90% of the impinging light outside of a 5° cone. Conversely, it is preferred that front layer 3a, when in its substantially transparent state, transmit at least 80% of the light impinging thereon. Although rear layer 3b has been shown as an uniformly dark light absorbing layer as a matter of convenience, it need not be so. For example, rear layer 3b could be for example a map, onto which projector 3a projects an overlay of some additional features, in which case rear layer 3b can be of a predominantly dark pattern, with some light colored or even bright elements. However, it is not desirable that rear layer 3b be predominantly bright, for of course that would wash out the image being projected onto front layer 3a.

FIGS. 2a and 2b show another embodiment of our invention. Display 5 comprises, similarly to the display of FIGS. 1a and 1b, a projector 6 which intermittently projects an image onto a screen comprising front layer 7a and rear layer 7b. From layer 7a is switchable from a substantially transparent state to a dark, light absorbent state (preferably absorbing at least 80% of the light impinging thereon). Rear layer is light scattering, and may be made of the materials of which projection screens are typically made. Synchronizer switch 8 synchronizes the switching of front layer 7a so that it is in its transparent state when projector 6 is projecting an image (FIG. 2a) and in its dark state when the projector 6 is not. In FIG. 2a, light from the projector (and ambient light) passes through front layer 7a and is scattered back towards the viewer by rear layer 7b, so that he or she sees a bright image. In FIG. 2b, the light impinging on the screen—that is, ambient light—is absorbed by front layer 7a, producing a high contrast image.

It is not necessary that the screen comprise two halves, as shown in FIGS. 1a-b and 2a-b. In the embodiment of FIGS. 3a and 3b, a display 10 with an integral screen is shown. Projector 11 intermittently projects an image onto screen 12, as described hereinabove. Screen 12 is switchable between a light scattering state (FIG. 3a) and a light absorbent state (FIG. 3b). Synchronizer switch 13 synchronizes the switching of screen 12 such that the latter is in its light scattering state when the image is being projected thereonto, but is in its light absorbent state when the image is not, causing the viewer to see a high contrast but yet bright image.

The screen need not switch entirely all at once, that is, as a whole, but may do so in segments. Such an approach is advantageous with displays such as cathode ray tube (CRT) projection displays, which scan the screen and project an image in segments, as opposed all at once over the entire screen. Because the scanning rate is so fast, the human eye perceives a single image. Such a display is shown schematically in FIG. 4. CRT projection display 15 comprises a CRT projector 16, whose raster scans screen 17 in segments (stripes being a convenient shape for each segment), illuminating each segment with a corresponding portion of the overall image. Screen 17 is itself segmented in segments, each segment corresponding in width to the width of a raster scan. Because the raster scan commonly proceeds horizontally across the screen, segments in the shape of stripes are preferred. Screen 17 can be of the two-layer type, such as shown in FIGS. 1a-b and 2a-b, or of the one-layer type, such as shown in FIGS. 3a-b. Whether of the one or two-layer construction, each segment in screen 17 can be switched between a light absorbent state and a light scattering state. Synchronizer switch 18 synchronizes the switching of the screen 17 segments with the raster scan, so that only the segment onto which the raster is projecting an image is in its scattering state, the other segments being in the dark or absorbing state. Again, a high contrast display image is produced.

FIG. 5 shows schematically another embodiment in which the image is projected intermittently onto the screen. In display 20, light from cylindrical lens setup 21 (comprising a light source, a parabolic reflector, and a lens) is reflected by oscillating mirror 24 through segments of imaging element 25 and projected by lens 26 onto screen 27. Imaging element 25 can be a stationary image, for example a slide, or can be a changing image. Screen 27 is partitioned into segments corresponding to the segmentation of the image of slide 25. Each segment is switchable between a scattering and a dark state, as hereibefore. Synchronizer switch 28 synchronizes the switching of the segments of screen 27 and the oscillation of mirror 24, such that only the segment onto which light is being projected is in its scattering state, the remaining segments being dark. In the cases of a rectangular beam, some overlap in timing between adjacent segments is desirable.

The displays of this invention can also be rear projection displays. Such an embodiment is shown in FIGS. 6a and 6b. Rear projection display 30 comprises a projector 31 which intermittently projects an image onto a two-layered screen having a front layer or half 32a and a rear layer or half 32b. Rear layer 32a is made of a material which scatters light forward, such as typically used for rear projection screens. Front layer 32a is switchable between a transparent mode and a dark, light absorbing mode. Synchronizer switch 33 synchronizes the switching of layer 32a such that it is transparent when projector 31 is projecting (FIG. 6a) and dark when projector 31 is not.

Another rear projection display is shown in FIGS. 7a and 7b. Rear projection display 35 comprises intermittent projector 36, switchable screen 37, and synchronizer switch 38. Switchable screen 37 is of the single layer type such as shown in FIGS. 3a-b above. Synchronizer switch 3 synchronizes the switching of screen 37 such that it is scattering when projector 36 is projecting and dark when projector 36 is not.

Yet another rear projection display of this invention is shown schematically in FIGS. 8a and 8b. In display 40, intermittent projector 41 is placed inside a case or shroud 42, which is dark and absorbent. Projector 41 projects onto switchable screen 43, which is switchable from a forward scattering state to a transparent state. Synchronizer switch 44 synchronizes the switching of screen 43 with the projection of projector 41, such that screen 43 is scattering when projector 41 is projecting and transparent when projector 41 is not. When projector 41 is not projecting, then incident light passes through screen 43 and is absorbed in casing or shroud 42.

The displays of this invention also include non-projection displays, such as CRT monitors or television receivers, liquid crystal displays and other reflective or backlit displays. Generally, in these displays, a shutter or overlay is used. FIG. 9 shows a high contrast CRT display 45 according to this invention. Display 45 comprises a conventional CRT tube 46 onto whose screen (partially hidden, not numbered) an image is formed by raster scanning. As the raster scans a particular segment of the screen, the phosphors in that particular segment are activated and emit light. Between the fluorescent screen and the viewer is segmented shutter 47, each of whose segments is switchable between a dark, light absorbing and a transparent state. Stripes are a convenient shape for the segments. Synchronizer switch 48 synchronizes the switching of the segments with the raster scan such that each segment is transparent when the phosphors behind it are emitting light, but light absorbent when they are not. Although the display in FIG. 9 is shown as a CRT display, those skilled in the art will understand that this invention can be used with other selfluminous displays, such as plasma and electroluminescent displays.

FIG. 10a shows a backlit liquid crystal display 50a, comprising a liquid crystal imaging cell 51 which is backlit by an array of intermittent light sources 52 (for convenience only one is labeled). Over cell 51 is a shutter 53, which is switchable between a transparent state (shown) and an absorbent state (not shown). When the light sources 52 are turned on, synchronizer switch 54 synchronizes the switching of shutter 53 so that it is in its transparent state, permitting a bright image to reach the viewer. When the light sources 52 are off, synchronizer switch 54 switches shutter 53 to its dark state. FIG. 10b shows a similar backlit liquid crystal display 50b (like numerals designating like parts), except that shutter 53b is a segmented one, with a segment corresponding to each light source 52. Synchronizer switch 54 synchronizes the firing of each light source 52 and the switching of each segment of shutter 53b, so that the segment corresponding to each light source is transparent when that light source is on, and dark when that light source is off.

A reflective display according to this invention is shown in FIG. 11. Reflective display 55 comprises a display cell 56, on which the image to be visualized is formed, a reflector 57 behind display cell 56, and a segmented shutter 58, each segment of which is switchable between a transparent and a dark, light absorbing state. Light source 59 (for example, a row of spotlights) scans the face of the shutter. Synchronizer switch 60 synchronizes the scanning by light source 59 with the switching of each segment, so that a segment is transparent when light source 59 is shining on it, and dark otherwise. In this manner, the display segments which are being illuminated appear bright, while the parts which are not being illuminated appear dark, improving contrast. An alternative embodiment in which the shutter is not segmented but instead switches as a whole is shown in FIG. 12. Reflective display 65 comprises a display cell 66, a reflector 67 behind display cell 66, and a shutter 68 which switches between a transparent state and a light absorbing state in response to signals from synchronizer switch 70. Light source 69, which may be for example an array of spotlights or a strobe light, intermittently illuminate the face of shutter 68. The switching of shutter 68 is synchronized so that it is transparent when light source 69 is shining light thereupon, but dark when light source 69 is not.

Preferably the shutters and screens, which switch from a scattering or light absorbing state (depending on the specific embodiment) to a light transparent state, comprise an encapsulated liquid crystal material, whose preparation is disclosed in U.S. Pat. Nos. 4,435,047 (1984), 4,606,611 (1986), 4,616,903 (1986), and 4,707,080 (1987), all to Fergason; published European patent application EP 156,615 (1985), by Pearlman et al.; U.S. Pat. No. 4,671,618 (1987), to Wu et al.; U.S. Pat. Nos. 4,673,255 (1987) and 4,685,771 (1987), to West et al.; and U.S. Pat. No. 4,688,900 (1987) to Doane et al.; the disclosures of each which are incorporated herein by reference. In encapsulated liquid crystal material, discrete volumes of liquid crystals are encapsulated, dispersed, embedded or otherwise contained in a containment medium. "Liquid crystals" denotes a composition having liquid crystalline properties, whether that composition is a single discrete liquid crystalline compound, a mixture of different liquid crystalline compounds, or a mixture of liquid crystalline and non-liquid crystalline compounds.

Liquid crystals have typically elongated molecular shapes, with a tendency to align or orient themselves with their long molecular axes parallel to each other. This alignment causes liquid crystals to be anisotropic, meaning that their measured physical, optical, and other properties are dependent on the direction of measurement (parallel or perpendicular to the direction of alignment). Further, the alignment direction can be influenced by an external stimulus, such as an electrical or magnetic field, causing the liquid crystals to exhibit a particular value of a physical characteristic in one direction when the stimulus is absent, but rapidly switching to a different value when the stimulus is applied. It is because of their anisotropy and their ready realignment that liquid crystals are useful as materials for displays.

The containment medium is preferably a polymeric material. Suitable containment media include but are not limited to poly(vinyl alcohol), polyurethane, acrylic and methacrylic polymers and copolymers, epoxies, polyolefins, vinyl polymers, and the like.

Encapsulated liquid crystal material can be formed by deposition from an emulsion containing both the containment medium and liquid crystals or by the evaporation of liquid from a solution containing both containment medium and liquid crystals. It can also be formed by making an initially homogeneous mixture containing both containment medium and liquid crystals at an elevated temperature, then cooling to phase-separate out liquid crystal volumes contained in the containment medium. Further, it can be formed by an in-situ polymerization process, in which the containment medium is polymerized and simultaneously encapsulates liquid crystal material. The liquid crystal need not be entirely surrounded by the polymer, and may exist as part of a system with co-continuous phases.

In one embodiment, the encapsulated liquid crystal material is substantially non-transparent in the absence of a sufficient electric field (the "field-off" state) and substantially transparent in the presence of a sufficient electric field (or "field-on" state). The electric field induces a change in the alignment of the liquid crystals, in turn causing the encapsulated liquid crystal material to switch from a highly light-scattering (and/or absorbent) state to a highly non-scattering and substantially transparent state. Generally, it is preferred that the liquid crystals have a positive dielectric anisotropy and that the ordinary index of refraction of the liquid crystals be matched with the refractive index of the containment medium, while the extraordinary index of refraction is substantially mismatched therewith. The physical principles by which such encapsulated liquid crystal material operates is described in further detail in the aforementioned references, particularly the patents to Fergason. Thus, a screen or shutter made of encapsulated liquid crystal material can be made to switch from a light scattering state to a substantially transparent state by the application of an electric field.

Pleochroic dyes have been mixed with liquid crystals to form a solution therewith. The molecules of pleochroic dyes generally align with the molecules of liquid crystals, so that the application of the electric field affects not only the predominant alignment of the liquid crystals, but also of the pleochroic dye. As the extent of the absorption of incident light by the pleochroic dye depends on its orientation relative to the incident light, the application of an external stimulus to a liquid crystal-pleochroic dye combination also provides a means for the controlled attenuation of light. (Thus, as used herein, the term "liquid crystals" also means, in context, liquid crystals containing pleochroic dye dissolved therein.) Pleochroic dyes may be used in encapsulated liquid crystals, as described in the aforementioned Fergason patents, or in non-encapsulated systems, as described in Goldmacher et al., U.S. Pat. No. 3,499,702 (1970) and Heilmeier, U.S. Pat. No. 3,551,026 (1970). A screen or shutter comprising liquid crystal material into which a intensely colored (preferably dark colored) pleochroic dye has been incorporated can be made to switch between a dark, highly light absorbent state and a light, light transmissive state by the application or removal of an electric field to the liquid crystal material.

If an encapsulated liquid crystal material which switches between a dark, absorbent state and a scattering state is desired, it can be prepared by incorporating a pleochroic dye into a encapsulated liquid crystal material in which the refractive index of the containment medium is not matched with the ordinary index of refraction of the liquid crystals.

The means for applying the electric field may be various. Generally, the liquid crystal material has an electrically conductive material or electrode on either side. The application of a sufficient voltage across the two electrodes then induces a corresponding change in the visual appearance of the liquid crystal material between the electrodes. Typically, the transparent electrode material comprises a thin coating of a metal or metal oxide, such as gold, nickel, indium tin oxide, and the like.

The improved contrast provided by the synchronized screens or shutters is shown experimentally as follows. In FIG. 13a, a projector 75 (Kodak model LC500) projects an image onto a screen 79 made of encapsulated liquid crystal material and having a black shroud 78 at its backside. Screen 79 is switchable between a transparent to a scattering state. A wheel 76, rotating at a constant speed, is placed between projector 75 and screen 79. As shown in FIG. 13b, wheel 76 has an window 76a therein with a sector angle of 45°, so that light from the projector can be interrupted regularly, and a timing slot 76b. The side of the wheel facing screen 79 and the viewer is matte black. Photodetector 77 senses the position of slot 76b, and, thence, the position of window 76a and when the wheel is permitting light from the projector 75 to reach screen 79. Control circuitry 80 is used to switch screen 79 to its transparent state when light from projector 75 is not impinging on it, and to its scattering state when light from projector 75 is impinging on it.

A type of circuitry suitable for controlling the switching of screen 79 is shown in FIG. 14. The circuit comprises a phototransistor/LED detector, a source of low voltage square waves from an oscillator, an analogue gate, and an amplifier. As the timing slot passes between the phototransistor/LED combination, it turns the transistor off. This causes the control voltage applied to the analogue gate to fall, isolating the oscillator from the power amplifier. As the timing slot leaves the photodetector, the analogue gate opens and the amplifier signal is applied to the screen. The net result is that the encapsulated liquid crystal material in the screen is held in the transparent state by the amplified square wave; when window 76b is not in front of the projection lens of projector 75, the applied voltage is removed, and the encapsulated liquid crystal material turns to its scattering state.

Using a 386AT computer equipped with a VGA-to-NTSC card, a pattern of light and dark horizontal stripes was created and fed into projector 75. The brightness of the stripes was measured alternatively with the laboratory in darkness, with normal laboratory lights on, and with the screen illuminated by an overhead projector to simulate various levels of ambient lighting. In each variation of simulated ambient lighting measurements were made with and without synchronized switching of the screen. To indicate the ambient light level, a small piece of white paper was attached to the screen near the measuring points. Illumination of the stripes and the paper was measured with a Pritchard PR500 Research Photometer. The results are provided in Table I below.

TABLE I

| Ambient Lighting | | Screen synchro-nized | Light Stripe (cd/m$^2$) | Dark Stripe (cd/m$^2$) | Contrast Ratio |
|---|---|---|---|---|---|
| Source | Intensity (lux) | | | | |
| None (room dark) | 1.41 | No | 48.03 | 4.08 | 11.8 |
| | 1.41 | Yes | 29.81 | 2.84 | 10.5 |
| Normal room lights | 599.5 | No | 62.01 | 18.02 | 3.4 |
| | 599.5 | Yes | 34.95 | 8.46 | 4.1 |
| Overhead projector | 1,118.4 | No | 56.56 | 21.58 | 2.6 |
| | 1,118.4 | Yes | 40.29 | 11.85 | 3.4 |

These results show that in a brightly lit environment, synchronization of the screen provides an improved contrast.

FIG. 15 shows shcematically a generalized synchronization circuit. The video source (a VCR, tuner, computer graphics card, etc.) provides a horizontal synchronization pulse for line counting and a vertical synchronization pulse for resetting at the start of a new field or frame. The horizontal synchronization pulse is fed to a divider to count out N-lines worth of time. In a) a counter/select combination is used to drive a screen and display illuminator synchrnously such that both operate to produce an image for 1/Mth of the time. In b) the counter/select combination selects segments of the screen in turn so as to synchronize with a raster scan, for example.

We claim:

1. A projection display presenting an image with improved contrast, comprising
   (a) a screen which is switchable between a strongly light scattering state and a substantially transparent state;
   (b) projection means for intermittently projecting an image onto the screen;
   (c) a housing containing the projection means and onto which the screen is mounted; the housing having a strongly light absorbing interior; and
   (d) switching means for switching the screen synchronously with the projection of the image thereonto by the projection means, such that the screen is in its strongly light scattering state when the image is being projected thereonto and is in its substantially state when the image is not being projected thereonto.

2. A projection display according to claim 1, wherein the screen comprises encapsulated liquid crystal material.

3. A projection display presenting an image with improved contrast, comprising
  (a) a screen comprising a plurality of segments, each segment being switchable between a strongly light scattering state and a substantially transparent state;
  (b) projection means for sequentially projecting a portion of an overall image onto each segment;
  (c) a housing containing the projection means and onto which the screen is mounted; the housing having a strongly light absorbing interior; and
  (d) switching means for switching each segment synchronously with the projection thereonto of the portion of the overall image by the projection means, such that each segment is in its strongly light scattering state when the portion of the overall image is being projected thereonto and is in its substantially transparent state when the portion of the overall image is not being projected thereonto.

4. A projection display according to claim 3, wherein the screen comprises encapsulated liquid crystal material.

* * * * *